3,318,731
METHOD OF MAKING ELECTRICALLY INSULATED FERROUS MAGNETIC SHEET MATERIAL
Heinz Blum, Frankfurt am Main, Germany, assignor to Hooker Chemical Corporation, Niagara Falls, N.Y., a corporation of New York
No Drawing. Filed Jan. 31, 1963, Ser. No. 255,195
Claims priority, application Germany, Feb. 3, 1962, M 51,683
5 Claims. (Cl. 117—215)

The present invention broadly relates to the formation of electrically nonconductive coatings on ferrous substrates and more particularly is directed to a process for forming an improved electrically insulating coating of high resistivity on magnetic sheet material which is applicable for use in the manufacture of laminated cores of the type employed in transformers, electric motors, electric generators, and the like.

Various materials and techniques have heretofore been used or proposed for use for forming insulating coatings on the surfaces of magnetic sheet material facilitating their use in the manufacture of laminated cores employed in various electrical components. Inorganic nonmetallic type coatings are now in widespread commercial use and have, to a large extent, displaced organic type coatings of the types heretofore known. Insulating coatings of an inorganic nonmetallic type to which the present invention is applicable have been found to provide for superior insulating characteristics and are simpler and more economical to apply than organic type coatings heretofore employed. These inorganic nonmetallic coatings nevertheless are subject to the disadvantage that they are susceptible to dislodgment from the surface to which they are applied during the handling of coated sheet material while undergoing the several heat treating, forming, cutting, and assembly operations to which the magnetic sheet material is subjected.

Inorganic nonmetallic insulating coatings of the type presently employed commercially, comprise mechanically deposited coatings of refractory metal oxides and salts which are heat reacted or "burned-in" at an elevated temperature effecting a chemical bonding to the metal surface or, alternatively, can comprise chemical coatings, principally phosphate coatings which are applied in solution form and chemically react with the metallic substrate or are precipitated thereon. It has also been proposed to employ combinations of such coatings such as, for example, a refractory metal oxide coating followed thereafter by an overlying phosphate coating.

Mechanically deposited coatings conventionally comprise finely particulated refractory materials such as, for example, magnesium oxide, alumina, calcined dolomite, or zirconia which are applied such as by dusting on the surface of the metal sheet. Alternatively, the finely particulated refractory particles can be applied in the form of a slurry or suspension in water or in suitable volatile solvents which evaporate during the subsequent heat treating operation leaving a residuary deposit of the refractory particles. When these particles are dusted on the surface of the metal, the resultant layer is extremely susceptible to dislodgment during handling and, accordingly, this has necessitated the application of the coating immediately prior to the heat treating operation to effect a bonding of the particles to the metal substrate. Usually this heat bonding or "burning-in" of the particles is achieved during a box annealing treatment to which the ferrous magnetic sheet material or stamped laminations are treated to improve their magnetic characteristics.

It has also been proposed to apply such finely particulated refractory materials in the form of a paint in which the particles are suspended in a thermally decomposable binder which reduces the tendency of dislodgment of the particles during handling prior to the heat treatment operation. A typical coating composition and method of applying finely particulated refractory particles to a metallic substrate employing a methyl cellulose binder is disclosed in United States Patent No. 2,641,556 to which reference is made for a more detailed description of a typical refractory coating composition to which the present invention is applicable. Regardless of the particular manner by which the refractory particles are applied to the surface of the metal sheet, the resultant deposited coating is conventionally heated from a temperature ranging from about 700° C. up to about 1200° C. during which chemical bonding of a substantial portion of the particles to the metal surface is achieved and during which the magnetic sheet material simultaneously may be annealed.

In lieu of or in combination with the particulated refractory coatings hereinabove described, chemically deposited coatings, specifically phosphate coatings, can also be satisfactorily employed for providing an insulating coating on the surfaces of the magnetic sheet material. Such phosphate coatings due to their relatively fragile nature and low abrasion resistance are also subject to the disadvantage of being susceptible to dislodgment from the surface of the magnetic sheet during subsequent handling as required in the cutting and assembly operations for making magnetic cores.

It is accordingly an object of the present invention to provide a method of improving the properties of such inorganic nonmetallic coatings providing improved insulating characteristics and simultaneously reducing the susceptibility thereof from being dislodged from the surface of the metallic sheet.

Another object of the present invention is to provide a method for providing improved electrically insulating coatings of high resistivity on ferrous magnetic surfaces which possess improved abrasion resistance, increased adhesion to the metal substrate, improved corrosion protection of the underlying metal surface, which impart improved stamping or cutting characteristics to the coated metal sheet, and further provide for improved appearance of the coated sheet material.

Still another object of the present invention is to provide a process for providing improved inorganic nonmetallic insulating coatings on the surfaces of magnetizable sheet materials which are tenaciously bonded to the metal substrate enabling the sheet material to undergo various handling, forming, stamping, cutting, heating, assembling and shipping operations without encountering fracture, dislodgment, or separation of the coating which commonly was encountered in coatings of the type heretofore known.

A further object of the present invention is to provide an improved process for forming tenaciously bonded inorganic nonmetallic insulating coatings on ferrous magnetic sheet materials which is simple and economical to operate and control, and which coating increases the versatility in the manufacturing operations to which the coated sheet is subsequently subjected.

The foregoing and other objects of the present invention are achieved by applying an inorganic nonmetallic coating on the surfaces of a ferrous magnetic sheet material and thereafter densifying the applied coating into a substantially compact and uniform layer which enhances its physical and electrical insulating characteristics. In accordance with a preferred embodiment of the present invention, a ferrous magnetic sheet material is provided with a chemically deposited phosphate type coating of a controlled thickness which is thereafter compacted such as by rolling, for example, into a substantially dense layer having a resultant minimum thickness of at least 2 microns.

The ferrous magnetic material to which the present invention pertains includes silicon steel, common iron, nickel-iron alloys, and the like, which are suitable for use and possess the requisite magnetizable quantities as required in electrical apparatus such as the cores of transformers, motors, generators, etc. The material can be conventionally provided in the form of large sheets, strips, a strip coil of indefinite length, as well as stamped or blanked articles of the desired configuration which are satisfactory for forming laminated cores. Usually, it is preferred to apply the inorganic nonmetallic coating directly to the surfaces of large sheet or strip material after which the individual laminations are cut and heat treated.

The inorganic nonmetallic coatings to which the present invention is applicable, include the refractory type coatings as hereinabove set forth which comprise finely particulated refractory materials such as magnesium oxide, zirconia, alumina, calcined dolomite, mica, silica, and the like, as well as mixtures thereof, which are mechanically applied to the surface of the sheet and thereafter chemically bonded thereto by subjecting the coated sheet to an elevated temperature sufficient to effect a chemical interaction which usually is in excess of about 700° C. The refractory particles can be applied in the form of a dry dust, an aqueous slurry, a suspension in a volatile solvent, in the form of a paint including a thermally decomposable binder, as well as in the form of a slurry employing a methyl cellulose binder as disclosed in the aforementioned United States patent. During the subsequent heat reaction or "burning-in" of the refractory particles, only a portion thereof are chemically bonded to the surface of the metal sheet and the remainder are only loosely deposited thereon. In addition, some of the bonded particles are adhered by a relatively small bonding area such that they are susceptible to dislodgment during the handling of the sheet during subsequent manufacturing operations.

In accordance with the practice of the present invention, the densification of the particulated refractory coating after heat reaction substantially enhances the bond between the coating and underlying substrate as well as increasing the uniformity in thickness and coverage of the deposited coating. The foregoing coatings are initially applied to a thickness of generally from about 6 microns up to about 15 microns which on subsequent densification in accordance with the practice of the present invention, provides a compacted coating having a minimum thickness of approximately 2 to 4 microns. It should be pointed out that the desired thickness of the coating will vary depending on the roughness or irregularity of the metal surface to which the coating is applied. Conventionally, when the metal surface is comparatively rough, thicker coatings are required so as to assure a minimum coating thickness of at least about 2 to 4 microns over the projecting ridges of the surface thereby providing the requisite minimum insulating characteristics.

In lieu of the foregoing nonmetallic type insulating coatings comprising particulated refractory materials or in combination with such a coating, it is preferred, in accordance with the practice of the present invention to employ a phosphate type coating applied to the metal surface in solution form effecting a chemical reaction with and forming an adherent coating on the metal surface. The phosphate coating may comprise any of those well known in the art including the so-called reactive or "coating type" phosphates as well as the so-called nonreactive or "non-coating" type phosphates. The use of a coating type or non-coating type phosphate coating on the surfaces of the ferrous magnetic sheet material will vary depending on the particular manufacturing facilities available as well as on the temperature conditions to which the coated material is to be subjected during subsequent manufacturing operations and use.

The so-called coating type phosphates comprise aqueous solutions of metallic phosphate compounds including zinc phosphate, manganese phosphate, iron phosphate, as well as mixtures thereof wherein the metal ion in the solution becomes an integral part of the coating deposited on the metal substrate. In accordance with the practice well known in the art, the concentration of the phosphate ion calculated as $PO_4$ usually ranges from about 0.3% up to about 3% by weight in the coating solution. The phosphate ion may comprise, for example, dihydrogen phosphates, pyro-phosphates, meta-phosphates, and the like.

In addition to the metallic phosphate salts, the solution also contains suitable oxiding or accelerator agents such as nitrates, nitrites, chlorates, sulphites, peroxides, organic oxides, such as, for example, nitro organic compounds including nitrobenzine sulphonate, and the like. Conventionally, the oxidizing or accelerator agents are employed in concentrations ranging from a few hundredths of a percent such as from about 0.35% to a concentration up to about 3%, depending on the particular oxidizing characteristics of the accelerator agent employed as well as the composition of the phosphate solution. Coating type phosphate solutions are usually controlled within an acidity range of from about 1.8 to about 3.0 pH depending on the temperature of the solution which can conventionally range between about 120° F. to about 190° F.

The foregoing coating type phosphate solution provides a relatively heavy layer of a phosphate coating on the surface of the metallic sheet and can be applied by any of the conventional means known in the art including immersion, spraying, flowing, etc. The total time of contact of the solution with the surface of the metal sheet will vary depending on the particular composition and concentration of the phosphating solution as well as the temperature and mode by which the solution is applied. In accordance with the practice of the present invention, the conditions of applying the phosphate solution are controlled so as to provide a coating thickness ranging from about 6 microns up to about 15 microns which is subsequently densified in a manner to be described.

In lieu of the coating type phosphates hereinabove described, non-coating type phosphates can also be satisfactorily employed for forming a phosphate layer on the metal substrate. Non-coating type phosphates of the type well known in the art include the alkali metal phosphates such as sodium phosphate and potassium phosphate as well as ammonium phosphates. In addition, pseudo-coating type phosphate compounds such as calcium and magnesium phosphates can also be satisfactorily employed either alone or in admixture with the alkali metal phosphates or in the coating type phosphate solutions hereinabove described.

The non-coating type phosphate solutions conventionally have a pH ranging from about 1.8 up to about 5.0 and incorporate one or a mixture of accelerator agents of the types hereinabove described in connection with the coating type phosphate solutions. Since it is a characteristic of such non-coating type phosphate solutions to deposit a relatively thin coating when applied under conditions employed for the coating type phosphate solutions which ordinarily are of inadequate thickness to provide satisfactory insulating characteristics, it is preferred in accordance with the practice of the present invention to apply the non-coating phosphate solution to the metal surface in the form of a substantially uniform layer which thereafter is heated to an elevated temperature effecting heat bonding or "burning-in" of the precipitated coating providing a layer of the desired thickness. In order to obtain the necessary weight of phosphate compounds on the surface of the metal sheet, the solids content of the non-coating phosphate solution is preferably controlled within a range from about 15% to about 50% by weight. The non-coating phosphate solution can be applied by any manner well known in the art and is preferably doctored such as by a roll or knife to a substantially uniform controlled thickness. Subsequent heating and "burning-in" of the phosphate coating effects evaporation of the water therefrom leaving a residuary adherent coating which as hereinabove set forth preferably is of a thickness ranging from about 6 to about 15 microns.

Either the coating or non-coating type phosphate solutions can also be directly applied over the surfaces of the metal sheet having thereon a preliminary coating of the finely particulated refractory materials as hereinbefore described, forming therewith a composite insulating coating. Regardless of the particular type of inorganic nonmetallic coating deposited on the surfaces of the metal strip, an improvement in the coating is achieved in accordance with the practice of the present invention by subjecting the coated sheet to a densification increasing the density and uniformity of the coating while simultaneously increasing its bond to the underlying metal substrate and substantially increasing its abrasion resistance preventing dislodgment of the coating during subsequent handling of the coated sheet. The densification of the inorganic nonmetallic coating can be achieved by either one of a number of techniques well known in the art such as by pressing, and preferably by passing the sheet between a pair of compression rollers in a manner so as to effect a densification of the coating without effecting a material reduction or work hardening of the underlying metal sheet. Rolling pressures which effect a reduction in the thickness of the ferrous magnetic sheet material and a cold working thereof are to be avoided since such cold working usually effects a deterioration of the magnetic properties of the sheet material. Accordingly, it is preferred to adjust the rolling pressure so that deformation of the metal does not occur but only an extensive compression of the inorganic nonmetallic coating thereon.

The degree of densification of the inorganic nonmetallic coating can vary depending on the particular porosity and thickness of the initial coating deposited on the metal sheet. As hereinbefore set forth, a minimum thickness of the densified inorganic metallic coating which has been found necessary to provide satisfactory insulating characteristics ranges between about 2 to 4 microns. Accordingly, an initial coating thickness preferably ranging from about 6 to about 15 microns, can be densified to a final thickness ranging from about 2 to 6 microns, depending on the roughness of the metal surface. During the densification operation, the irregular nonuniform particulated refractory coating or the powdery porous phosphate coating is transformed into a substantially uniform, dense, adherent coating having a relatively bright shining appearance and having a substantially smooth surface. The resultant coatings are further characterized as having a higher disruptive voltage to effect a breakdown of the insulating coating in comparison to the coating prior to densification.

In addition to the improved electrical and physical characteristics of the densified inorganic nonmetallic coatings, it has further been found that through the greater adherence and compactness of the coatings, no dusting or flaking is encountered as a result of the mutual abrasion between adjacent sheets as a result of handling nor are residuary deposits of the coatings left on the cutting tools employed for cutting the laminations from the coated sheet. The substantial elimination of the dusting and flaking tendencies of these coatings also substantially eliminate the contamination of the electrical components which employ the resultant laminated cores made therefrom which in the case of refrigerator motors avoids contamination of the refrigerant.

The resultant coatings moreover provide for improved corrosion protection of the surfaces of the metal in comparison to the corrosion protection of the same coatings prior to densification in accordance with the present invention. The densified coatings have been found not to interfere with the machinability, cutting, and forming characteristics of the sheet and in the case of densified phosphate coatings, particularly zinc phosphate coatings, the cuttability characteristics of the sheet are improved to the extent that less hardening of the underlying metal occurs adjacent to the cutting edges which is evidenced in a reduction in the deterioration of the magnetic properties of the punched or stamped laminations in the vicinity adjacent to the cut edges thereof.

In order to further illustrate the method comprising the present invention, the following examples are provided. It will be understood however, that the examples are intended to provide further illustration of typical coatings which can be satisfactorily employed and are not intended to be limiting of the scope of the invention as more fully set forth in the subjoined claims.

*Example I*

A cold rolled silicon steel strip comprising 0.05% carbon, 0.5% silicon and the balance iron having a thickness of 0.5 millimeter (0.020 inch) was coated by immersion in a coating type phosphate solution having the following composition:

| Ingredient: | Grams per liter |
|---|---|
| $P_2O_5$ | 6.9 |
| $NO_3$ | 13.5 |
| Zn | 6.7 |
| Fe | 2.4 |
| Water | Balance |

The phosphate solution was maintained at a temperature of 55° C. and the duration of treatment was 10 minutes. At the completion of the phosphating operation, the coated sheet was rinsed with cold water and thereafter with water at a temperature of 80° C. and dried for 1 minute at 120° C. The resultant zinc-ferrous-iron phosphate coating had a thickness of 10 microns and was of a dark gray dull appearance.

The coated steel strip was thereafter subjected to a rolling operation wherein the coated strip having a total thickness of 0.520 millimeter (about 0.024 inch) was reduced to a net thickness of 0.512 millimeter (0.0202 inch) corresponding to a reduction in the thickness of the phosphate coating by about 40%. The resultant densified coating was observed to have a gray shining appearance.

*Example II*

A cold rolled silicon steel strip containing 0.04% carbon, 3.0% silicon, and the balance iron and having a thickness of 0.35 millimeter (0.0138 inch) was wetted on both sides thereof with a noncoating phosphate solution having a composition as follows:

| Ingredient: | Grams per liter |
|---|---|
| CaO | 45.5 |
| $NH_3$ | 32.5 |
| $P_2O_5$ | 288.5 |
| Water | Balance |

The solution film was applied and thereafter squeezed off and evened out by means of rubber rollers to a resultant layer thickness of about 25 microns. The strip having the wet coating on each surface thereof was thereafter heated in an oven to a temperature of 600° C. for a period of about 45 seconds to effect drying and a heat bonding or "burning-in" of the precipitated non-coating type phosphate layer thereon. The resultant substantially dry bonded coating comprising a calcium-iron-phosphate layer had a thickness of about 6 microns and was of a dull mouse gray appearance.

The coated cold rolled strip having a total thickness of 0.362 millimeter (0.0143 inch) was passed through a pair of compression rollers under a pressure so as not to deform the metal strip producing a resultant strip having a net thickness of 0.356 millimeter (0.0140 inch) corresponding to a densification or reduction in the thickness of the phosphate layer of about 50%. The resultant densified coating was observed to have a light gray shinning appearance.

While it will be apparent that the preferred embodiments herein illustrated are well calculated to fulfill the objects above stated, it will be appreciated that the invention is susceptible to modification, variation, and change without departing from the proper scope or fair meaning of the subjoined claims.

What is claimed is:

1. A process for applying an electrically insulating coating of high resistivity on the surfaces of a ferrous magnetic sheet material which comprises the steps of applying an inorganic nonmetallic coating to the surface of said sheet bonding said coating to said sheet to form a coating thereon having a thickness of at least about 6 microns, and thereafter densifying said coating into a substantially uniform layer having a thickness of at least about 2 microns, without substantial deformation of said ferrous magnetic sheet, which densified layer is thinner than the coating before densification and is characterized by being substantially uniform, smooth, adherent, non-dusting and flaking during handling and having a higher disruptive voltage to effect breakdown of insulation than the coating before densification.

2. A process for applying an electrically insulating coating of high resistivity on the surfaces of a ferrous magnetic sheet material which comprises the steps of applying an inorganic nonmetallic coating comprising finely particulated refractory particles selected from the group consisting of magnesium oxide, alumina, calcined dolomite, zirconia, silica, mica, as well as mixtures thereof to the surface of said sheet, heating said sheet and the coating thereon to an elevated temperature to effect bonding of said particles to said sheet to form a coating thereon having a thickness of at least about 6 microns, and thereafter densifying said coating into a substantially uniform layer having a thickness of at least about 2 microns, without substantial deformation of said ferrous magnetic sheet, which densified layer is thinner than the coating before densification and is characterized by being substantially uniform, smooth, adherent, non-dusting and flaking during handling and having a higher disruptive voltage to effect breakdown of insulation than the coating before densification.

3. A process for applying an electrically insulating coating of high resistivity on the surfaces of a ferrous magnetic sheet material which comprises the steps of applying and bonding an inorganic nonmetallic phosphate coating to the surface of said sheet to form a coating thereon having a thickness of at least about 6 microns, and thereafter densifying said coating into a substantially uniform layer having a thickness of at least about 2 microns, without substantial deformation of said ferrous magnetic sheet, which densified layer is thinner than the coating before densification and is characterized by being substantially uniform, smooth, adherent, non-dusting and flaking during handling and having a higher disruptive voltage to effect breakdown of insulation than the coating before densification.

4. A process for applying an electrically insulating coating of high resistivity on the surfaces of a ferrous magnetic sheet material which comprises the steps of applying a first layer of an inorganic nonmetallic coating comprising finely particulated particles of a refractory material on the surface of said sheet and bonding said particles thereto, applying and bonding a second inorganic nonmetallic phosphate coating on the surface of said sheet and overlying said first coating said first and second coating forming a coating having a thickness of at least about six microns, and thereafter densifying said first and said second coating into a substantially uniform layer having a thickness of at least about 2 microns, without substantial deformation of said ferrous magnetic sheet, which densified layer is thinner than the coating before densification and is characterized by being substantially uniform, smooth, adherent, non-dusting and flaking during handling and having a higher disruptive voltage to effect breakdown of insulation than the coating before densification.

5. A process for applying an electrically insulating coating of high resistivity on the surfaces of a ferrous magnetic sheet material which comprises the steps of applying an inorganic nonmetallic coating including a phosphate coating, a refractory coating comprising finely particulated refractory particles selected from the group consisting of magnesium oxide, alumina, calcined dolomite, zirconia, silica, mica and mixtures thereof; as well as combinations thereof; on the surface of said sheet in a thickness ranging from about 6 to about 15 microns, and thereafter densifying said coating into a substantially uniform layer having a thickness ranging from about 2 to about 6 microns, without substantial deformation of said ferrous magnetic sheet, which densified layer is thinner than the coating before densification and is characterized by being substantially uniform, smooth, adherent, non-dusting and flaking during handling and having a higher disruptive voltage to effect breakdown of insulation than the coating before densification.

References Cited by the Examiner

UNITED STATES PATENTS

| | | | |
|---|---|---|---|
| 1,823,869 | 9/1931 | Baur. | |
| 2,743,203 | 4/1956 | Steinherz | 148—6.15 |
| 2,884,351 | 4/1959 | Cavanaugh et al. | 148—6.15 |
| 3,138,492 | 6/1964 | Perry et al. | 148—6.15 |
| 3,151,000 | 9/1964 | Schmidt et al. | 148—6.15 |
| 3,214,302 | 10/1965 | Brodt et al. | 148—16.5 |

ALFRED L. LEAVITT, *Primary Examiner.*

MURRAY KATZ, RALPH S. KENDALL, *Examiners.*

W. L. SOFFIAN, J. R. BATTEN, JR.,
*Assistant Examiners.*